Aug. 19, 1969  K. LASSMANN  3,461,493
NOZZLE FOR PLASTIC MELTS
Filed Feb. 16, 1967  2 Sheets-Sheet 1
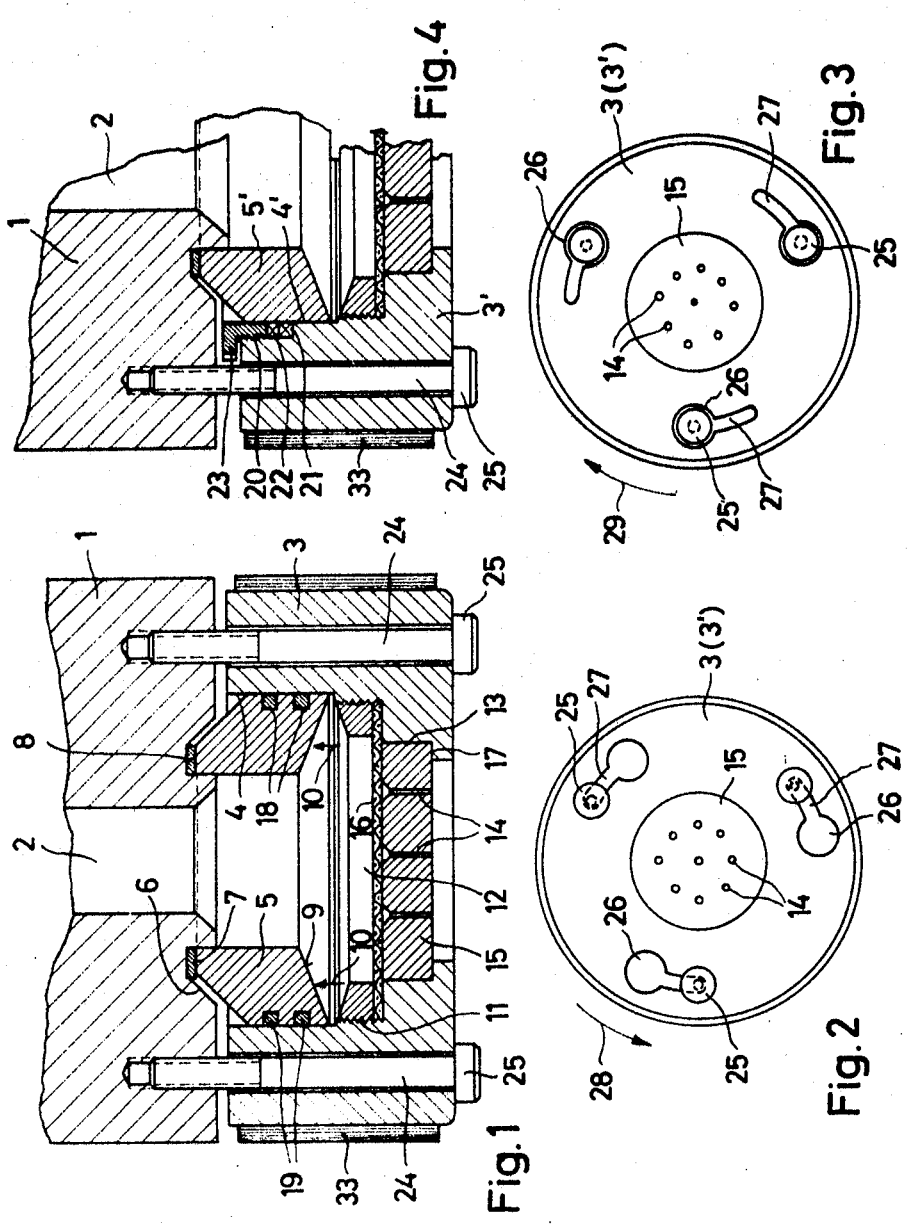
INVENTOR.
KARL LASSMANN
BY Bair, Freeman & Molinare
Attys.

United States Patent Office 3,461,493
Patented Aug. 19, 1969

3,461,493
NOZZLE FOR PLASTIC MELTS
Karl Lassmann, Frankfurt am Main, Germany, assignor to Vickers-Zimmer Aktiengesellschaft Planung und Bau von Industrieanlagen, Frankfurt am Main, Germany, a corporation of Germany
Filed Feb. 16, 1967, Ser. No. 616,694
Int. Cl. D01d *3/00*
U.S. Cl. 18—8    5 Claims

ABSTRACT OF THE DISCLOSURE

A nozzle for plastic material having a feed member, a nozzle holder attached to the feed member, and a seal for the plastic material being extruded through the feed member and through the nozzle holder. A cylinder bore is provided in the nozzle holder and an axially slidable ring is positioned within the bore. A first face on the ring member provides a seal between the feed member and the nozzle holder. A second face on the ring member receives hydraulic pressure from the plastic material being extruded and applies pressure on the first face to provide the desired seal between the slidable member and the feed member.

---

Field of the invention and description of the prior art

This invention relates to a nozzle structure for extruding plastic melts and solutions and it particularly relates to nozzles which have a nozzle plate holder detachably fastened to the feed body for the plastic and having packings for sealing the liquid plastic from the atmosphere.

The fastening and sealing of nozzle structures on a feed body for plastic, such as used for spinning or forming cables or threads for producing plastic cuttings or synthetic threads or fibers, presents significant problems because of the high temperatures and pressures of the liquid plastic being extruded. These problems are complicated when the nozzles are to be removed for cleaning or are to be interchanged without any serious interruptions in operations.

In the conventional nozzle structures, there are a large number of threaded bolts and/or nuts to be loosened or tightened. Because of the extrusion pressure on at least the spinning plate surface, the nuts and/or bolts must be tightened and/or put on with a high torque. The high temperature of the parts, which may be above 200° C., also causes thread corrosion. Thus, the loosening or tightening of the bolts often results in actual damage to the parts.

To solve certain of these problems, there is a known nozzle wherein the extrusion path of the liquid plastic is sealed against the atmosphere by packing rings which are pressed by the extrusion pressure against the sealing surfaces. With this structure, the sealing surfaces do not have to be pressed firmly against each other by clamping means, but the extrusion pressure, acting against the resistance of the packing ring, brings about a radial expansion of the ring which provides the desired seal. This, however, does not occur with low extrusion pressures, such as are present at the start of spinning, so that a positive sealing is not guaranteed at all operating conditions. Moreover, in this known nozzle arrangement, the packing ring directly contacts the plastic to be extruded. This sometimes has adverse effects on the plastic by the packing material, which may discolor the plastics. Furthermore, in the known nozzle arrangement, feed members and nozzle plate holders are screwed together, so that the previously mentioned maintenance difficulties are not satisfactorily solved.

As a result, the removal and mounting of known nozzle structures are extremely time-consuming and subject the maintenance men to burning hazards. As a result, there are appreciable interruptions in production operations.

It is therefore an object of this invention to provide a nozzle for extruding plastics wherein the disadvantages of prior art devices are substantially avoided.

It is also an object of this invention to provide a nozzle structure for extruding plastics wherein the removal and mounting of the nozzle is relatively quickly and easily assembled without significant hazard to the opeartor.

It is a further object of this invention to provide a nozzle for extruding plastics wherein the device is characterized by its simplicity and economy in construction, operation and maintenance.

Further purposes and objects of this invention will appear as the specification proceeds.

Summary of the invention

In the invention, the nozzle plate holder is provided with a cylindrical bore in which an axially slidable ring piston is positioned. The ring piston has an outer face which forms the sealing surface for connection to the feed member and an inner face which forms a hydraulic surface for the plastic material to be extruded. The nozzle plate holder is attached by means of a quick closure to the feed member. In this construction, material being extruded itself brings about the sealing as it presses the ring piston, through pressure build-up on the hydraulic action surface, against the feed member. The extrusion pressure acting on the nozzle plate holder or on the nozzle plate can be readily absorbed by a threadless quick closure member which is used to secure the nozzle plate holder to the feed member. Since the automatic pressing of the ring piston caused by the extrusion pressure is present only under operating conditions, no fastening means under high stress have to be loosened to mount and detach the nozzle plate holder. The invention therefore provides mounting and removal of the nozzle arrangement in time so that only brief interruptions occur in operation. Also, the burning hazard for the assemblymen is considerably reduced.

To achieve a positive seal between the ring piston and the feed member, the ring piston is advantageously designed so that its inner surface area is a multiple of the surface area of the outer face. In this way, surface pressures can be achieved at the packing, which are a multiple of the extrusion pressure.

Sealing the ring piston with respect to the nozzle plate holder is preferably accomplished by providing the outer circumference of the ring piston or the cylindrical bore of the nozzle plate with one or more circumferential grooves for receiving high-temperature packing rings. The packing rings, preferably of metal, can be made self-sealing.

The sealing between the ring piston and the nozzle plate holder may also be accomplished by a stuffing box arrangement wherein the cylindrical bore of the nozzle plate holder has a threaded section in its outer zone which is offset relative to the bore and receives a stuffing box with stuffing box gland. For improved guidance of the ring piston, the inside diameter of the stuffing box gland is substantially equal to the diameter of the cylinder box.

For sealing between the ring piston and the feed member, it is advantageous if the feed member, which is concentric with the extrusion feed, is provided with a packing groove, into which the piston ring extends.

Rapid closure devices are known, and the proposed rapid closure may be a variety of known types. The rapid closure may include at least three stand bolts fastened to the feed member. For releasing or mounting the nozzle plate holder, it is necessary to only slightly rotate the nozzle plate holder on its axis until the carrying heads stand opposite the corresponding bores in the nozzle plate holder to remove the same or until the carrying heads, through introduction of the bolt shafts into the slots, carry the nozzle plate holder.

A further advantageous construction of a rapid closure results if the rapid closure includes two interengaging bayonet rings, one of which is arranged on the feed member and the other on the nozzle plate holder. In this arrangement, the movement of the nozzle plate holder through a small angle of rotation is all that is necessary to fasten or loosen the nozzle arrangement.

Brief description of the drawings

Particular embodiments of the present invention are illustrated in the accompanying drawings, wherein:

FIG. 1 is a sectional view through a nozzle;

FIG. 2 is a transverse view of the nozzle shown in FIG. 1 with a bolted rapid closure;

FIG. 3 is a view similar to FIG. 2 except with an unbolted rapid closure;

FIG. 4 is a fragmentary sectional view similar to that shown in FIG. 1 but having an alternate packing arrangement between the ring piston and the nozzle plate holder.

Description of the preferred embodiments

Figure 5:
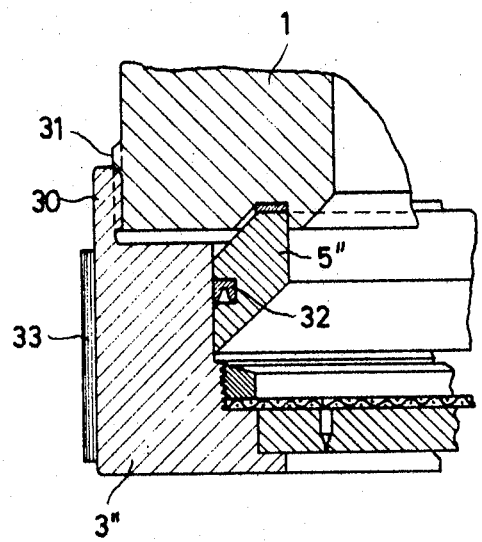
FIG. 5 is a fragmentary sectional view like FIGS. 1 and 4 except showing an alternate embodiment of a rapid closure.

A nozzle plate holder 3 is secured to a feed member or body 1, concentrically with a feed line 2. An axially slidable ring piston 5 is positioned in a cylindrical bore 4 of the nozzle plate 3. The outer end of the ring piston 5 extends into a packing groove 6 positioned in the feed member 1. A packing ring 8 is positioned between the bottom surface of the groove and the outer face 7 of the ring piston 5. The ring 8 is advantageously made of aluminum. The inner face 9 of the ring piston 5 having a larger surface area at the packing ring than at the outer face 7 to achieve a higher surface pressure, is acted upon by the pressure of the liquid plastic material to be extruded. The ring piston 5 is automatically slid upward in axial direction in the direction of the arrows 10 to provide tight sealing engagement of the face 7 against the packing ring 8.

The cylinder bore 4 includes a reduced threaded bore 11, downwardly of the piston 5, for receiving a threaded ring 12. Below the threaded bore 11, there is a cylindrical bore 13 of a further reduced diameter, which surrounds the nozzle plate 15 containing nozzle apertures 14. Above the nozzle plate 15, there are provided one or more filter screens 16, which are clamped between the threaded ring 12 and the step formed by the juncture between the threaded bore 11 and the cylindrical bore 13. The nozzle plate 15 abuts the annular step or shoulder 17.

The ring piston 5, in the embodiment of FIG. 1, has a pair of spaced circumferential grooves 18 in its outer periphery for receiving high-temperature packing rings 19.

In the embodiment of FIG. 4, there are no circumferential grooves in the ring piston 5', but the cylindrical bore 4' of the nozzle plate holder 3' is provided in its outer or upper portion with an enlarged threaded section 20 having a shoulder 21. The threaded section 20 receives a stuffing box 22 and a stuffing box gland 23. The stuffing box gland 23 can be operated either with the nozzle plate holder 3' removed from the feed member 1 or after the mounting of the nozzle plate holder 3' on the feed member 1. In the latter procedure, a tool is introduced into the gap between feed member 1 and the nozzle plate holder 3'. For improved guidance of the ring piston 5', the stuffing box gland 23 has an inside diameter which is substantially equal to the diameter of the cylinder bore 4'.

The rapid closure shown in FIGS. 1 to 4 includes three stay bolts 24, which are threaded into the feed member 1 and include an enlarged head 25 at their outer end. As most clearly shown in FIGS. 2 and 3, bores 26 are provided in the nozzle plate holder 3 or 3' and have a diameter of a size so that the heads 25 can pass through. Coextensive with the bores 26 are arcuate slots 27 which receive the stay bolt shafts in the bolted state. To remove the nozzle arrangement, the nozzle plate holder 3 or 3' is turned in the direction of the arrow 28 of FIG. 2 until the carrying heads 25 are aligned with the passage bores 26 as shown in FIG. 3. For bolting the rapid closure after placement of the nozzle arrangement, the nozzle plate holder 3 or 3' is turned in the direction of arrow 29 according to FIG. 3 until the parts occupy the position represented in FIG. 2. The undersurfaces of the carrying heads 25 lie essentially against the outer face of the nozzle plate holder 3 or 3' and thereby provide support therefor.

In the embodiment of FIG. 5, the nozzle plate holder 3" includes a projecting ring having a bayonet type ring along its inner surface. At least three bayonet supports are uniformly positioned along the circumference of the bayonet ring 30. The ring 30 engages with its bayonet projections (or recesses) in recesses (or projections) on a bayonet ring 31 mounted on the feed member 1. Alternatively, the feed member 1 may be equipped with a projecting ring which engages the nozzle plate holder 3" from the exterior rather than from the interior. It is also possible for the facing surfaces of the feed member 1 and the nozzle plate holder 3" to be provided with projections or indentations which interengage in a bayonet manner.

The ring piston 5" shown in the embodiment of FIG. 5 has a circumferential groove into which a lip packing 32 is inserted. This packing 32 provides for an automatic pressing of the packing both against the ring piston 5" and also against the nozzle plate holder 3". Also, several such packings 32 may be positioned between the ring piston 5" and the nozzle plate holder 3".

The nozzle plate 15 and the nozzle apertures 14 are schematically shown in the drawings. The nozzle plate and the nozzle apertures may be provided with any sequence number of nozzle apertures in suitable distribution. The nozzle plate shown in circular form in the drawings may be rectangular in form. Finally, instead of a nozzle plate provided with openings for the spinning of threads or cables, an extruder tool with any desired passage cross-section may be used.

The part designated throughout in the above description as a feed member 1 is, for example, the discharge end of a worm smelter, the discharge end of an autoclave standing under excess pressure, the lower part of a spinning pump block, or a part of a distributing system for liquid spinning material to a series of nozzle installations of the type described.

The new nozzle arrangement is distinguished by its time-saving, substantially tool-free mounting and removability, wherein the sealing is accomplished through the pressure of the material being extruded.

While in the foregoing there has been provided a detailed description of particular embodiments of the present invention, it is to be understood that all equivalents obvious to those having skill in the art are to be included within the scope of the invention as claimed.

What I claim and desire to secure by Letters Patent is:

1. A nozzle structure for extruding plastic material in one direction, said structure comprising a body having a feed line therein for passing said plastic material therethrough, an annular face on said body surrounding the outer end of said feed line, a nozzle plate holder detachably secured to said feed body, a cylindrical bore in said nozzle plate holder and aligned with said feed line, a nozzle plate carried by said holder for passing therethrough the plastic material passing in said one direction from said feed line and through said bore, an axially slidable ring member received within said bore, means on said ring member for sealing between said bore and said ring, a first face on said ring member spaced from the annular face on said body and in communication with the plastic material, and a second face of lesser area than said first face, said second face and said annular face of said body defining annular sealing means between said body and said holder, the pressure applied by said plastic material against said first face sliding said slidable member in an axial direction opposite to the said one direction of flow of said plastic material so as to apply sealing pressure between said second face and said annular face at said annular sealing means, said sealing pressure being greater than the pressure of said plastic material.

2. The device of claim 1 wherein said sealing means between said bore and said ring comprises packing ring means.

3. The device of claim 1 wherein rapid closure means are used for detachably securing said nozzle plate holder to said feed member.

4. The device of claim 3 wherein said rapid closure means comprises a plurality of stay bolts secured to said feed member, and elongated apertures in said nozzle plate holder for engaging said bolts.

5. The device of claim 3 wherein said rapid closure means comprises cooperating bayonet rings on said feed member and on said nozzle plate holder.

References Cited
UNITED STATES PATENTS

| | | |
|---|---|---|
| 2,784,843 | 3/1957 | Braunlich. |
| 2,891,278 | 6/1959 | Cook. |
| 2,958,097 | 1/1960 | Simpson et al. |
| 3,274,648 | 9/1966 | Van Orman. |

FOREIGN PATENTS 333,450   12/1958   Switzerland.

WILLIAM J. STEPHENSON, Primary Examiner